June 26, 1923.
M. E. LEIGH
DRAFT EVENER
Filed July 8, 1920
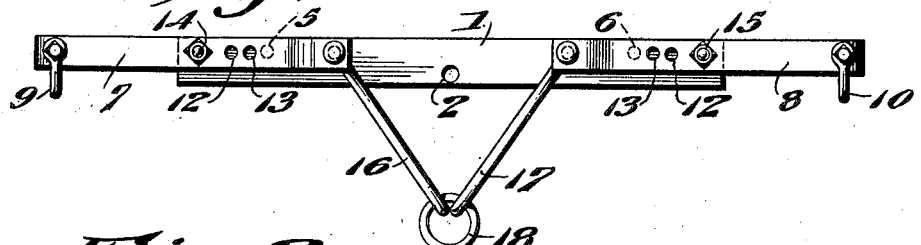
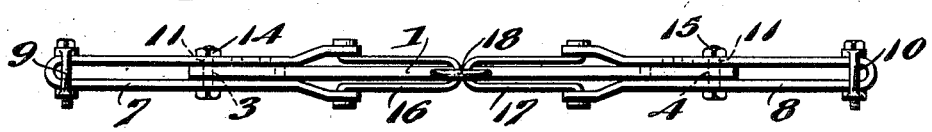
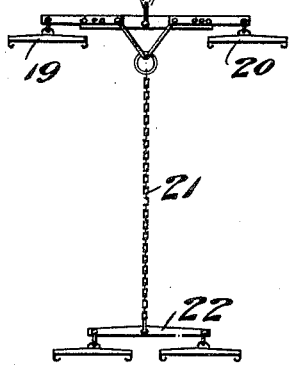
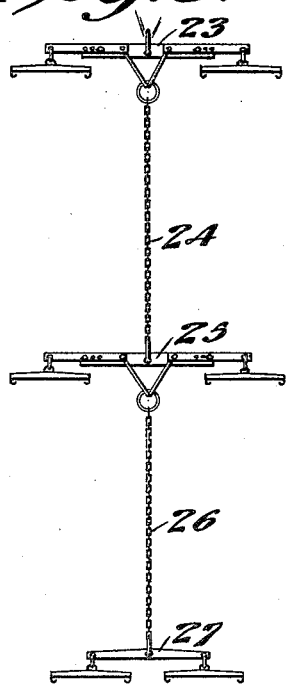
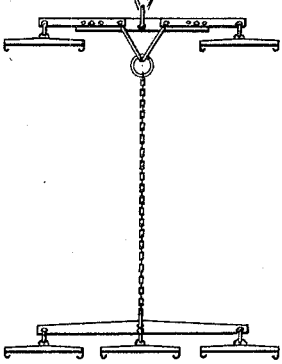
Inventor
M. E. Leigh
By R. W. McCracken,
his Attorney Patented June 26, 1923.

1,460,257

UNITED STATES PATENT OFFICE.

MILLARD E. LEIGH, OF BURLEY, IDAHO.

DRAFT EVENER.

Application filed July 8, 1920. Serial No. 394,698.

*To all whom it may concern:*

Be it known that I, MILLARD E. LEIGH, citizen of the United States, residing at Burley, in the county of Cassia and State of Idaho, have invented certain new and useful Improvements in Draft Eveners, of which the following is a specification.

My invention relates to an improvement in draft eveners, and particularly to a structure of this character in which two of the draft animals are hitched adjacent the vehicle or implement and the remaining animals are hitched to travel in advance.

An object is to provide a draft evener structure in which four or more draft animals can be hitched to draw a vehicle or implement and with which strain upon the animals and upon the evener structure is equalized.

A further object is to so construct and arrange the parts that by simple adjustments the evener structure is adapted for use with from four to six, or more, draft animals.

A still further object resides in constructing the parts of the evener entirely of metal and in so shaping and associating the various members that a maximum of strength is secured and at the same time the evener structure is kept down to a minimum weight and is made comparatively simple and inexpensive to manufacture.

With these and other objects in view which will be apparent from the drawings, specification, and claim, this invention includes certain novel features of construction and combinations of parts which will now be set forth.

In the drawings:

Figure 1 is a plan view of a draft evener constructed in accordance with my invention.

Fig. 2 is a view in front elevation.

Fig. 3 is a plan view showing the manner of using the evener with a four horse hitch.

Fig. 4 illustrates the hitch when five animals are used.

Fig. 5 discloses one connection which might be employed for six animals.

The main draft bar 1 is provided with an opening 2 in the center thereof through which a clevis is connected or a hitch is otherwise accomplished to the vehicle or implement, and this draft bar has openings 3 and 4 adjacent the ends thereof, another set of openings being provided at 5 and 6 slightly in from the ends of this bar.

Evener bars 7 and 8 are made of substantially U-shaped form, as shown in Fig. 2, and these evener bars have openings at the looped ends thereof in which clevises 9 and 10 are connected, the remaining ends of each U-shaped evener bar being provided with bearing openings. The evener bars each have three or more openings 11, 12, and 13 extending in alinement through the two legs thereof, bolts or pins 14 and 15 being provided to fit through these openings and through openings 3 and 5, and 4 and 6 at the ends of the draft bar to pivot the evener bars thereon, and the bolts being selectively adjustable to the different openings for purposes which will be hereinafter more fully set forth.

At their inner ends provided with the bearing openings, the evener bars are bent to spread slightly from the draft bar, as shown in Fig. 2, substantially U-shaped draft members 16 and 17 have their ends fitted through the bearing openings in the ends of evener bars 7 and 8, a hitch ring 18 being connected in the loops of these draft members.

In the showing in Figs. 1, 2, and 3 the draft evener structure is adjusted and assembled for a four horse hitch, and in this adaptation the bolts 14 and 15 are fitted through openings 11 of the evener bars 7 and 8 and the openings 3 and 4 at the ends of the draft bar. Singletrees 19 and 20, shown in Fig. 3, are connected with clevises 9 and 10, and a draft cable or chain 21 connected with hitch ring 18 has a doubletree 22 connected therewith. By this connection and arrangement two animals are hitched adjacent the vehicle or implement with two in advance, and through the balancing of the pull on the evener bars 7 and 8 the draft is evened and equalized upon the wheel and lead animals.

As shown in Fig. 4, five animals are used, two being hitched adjacent the vehicle or implement, and three in the lead. To even the draft upon the animals, bolts 14 and 15 are adjusted to pass through openings 12 of the evener bars and the openings 5 and 6 in draft bar 1. Where five animals are used they might be hitched three abreast in the lead or two can be placed in advance of the wheel animals and the third can be placed in front as a lead animal.

In Fig. 5 a slight modification in the manner of accomplishing the hitch, to accommodate six animals, is shown. As here illustrated at the evener 23, the bolts 14 and 15 are connected through openings 13 of the evener bars 7 and 8 and the openings 5 and 6 of the draft bar. A draft cable or chain 24 is connected in hitch ring 18 and a second draft evener, generally indicated at 25, is attached at the end. This draft evener 25 is assembled for a four horse hitch and a draft chain or cable 26 connected in the hitch ring thereof has a doubletree 27 at its end. By this arrangement the draft evener structure at 23 equalizes for the six horses, and the draft evener at 25 equalizes for the four horses hitched thereto.

Other hitches might be made in each of the instances mentioned and by providing other openings through the evener bars and the ends of the draft bar adjustment might be made for a greater or less number of animals than herein mentioned.

While, in the foregoing, I have described specific embodiments, and have mentioned only certain possible modifications, it will be appreciated that in practice I do not limit myself to such specific details as herein set forth, but may resort to any practical modifications falling within the scope of the invention as defined in the appended claim.

I claim:

A draft evener comprising with a draft bar having a hitch opening at its center and a plurality of spaced openings adjacent each end, a pair of substantially U-shaped evener bars each having a plurality of spaced openings formed through their middle portions and alined through the two legs, pivot means passed through the openings of said draft bar and evener bars to pivotally mount the evener bars, U-shaped draft members with up-turned ends pivoted in the extremities of the two legs at the inner ends of each of said evener bars, a hitch ring connected in the loops of said draft member, and hitch connections provided at the outer looped ends of said draft bars.

In testimony whereof I affix my signature.

MILLARD E. LEIGH.